Feb. 17, 1970     T. PATERSON ET AL     3,495,535
FUEL INJECTION APPARATUS FOR MOTOR VEHICLES
Filed Aug. 16, 1968     2 Sheets-Sheet 1
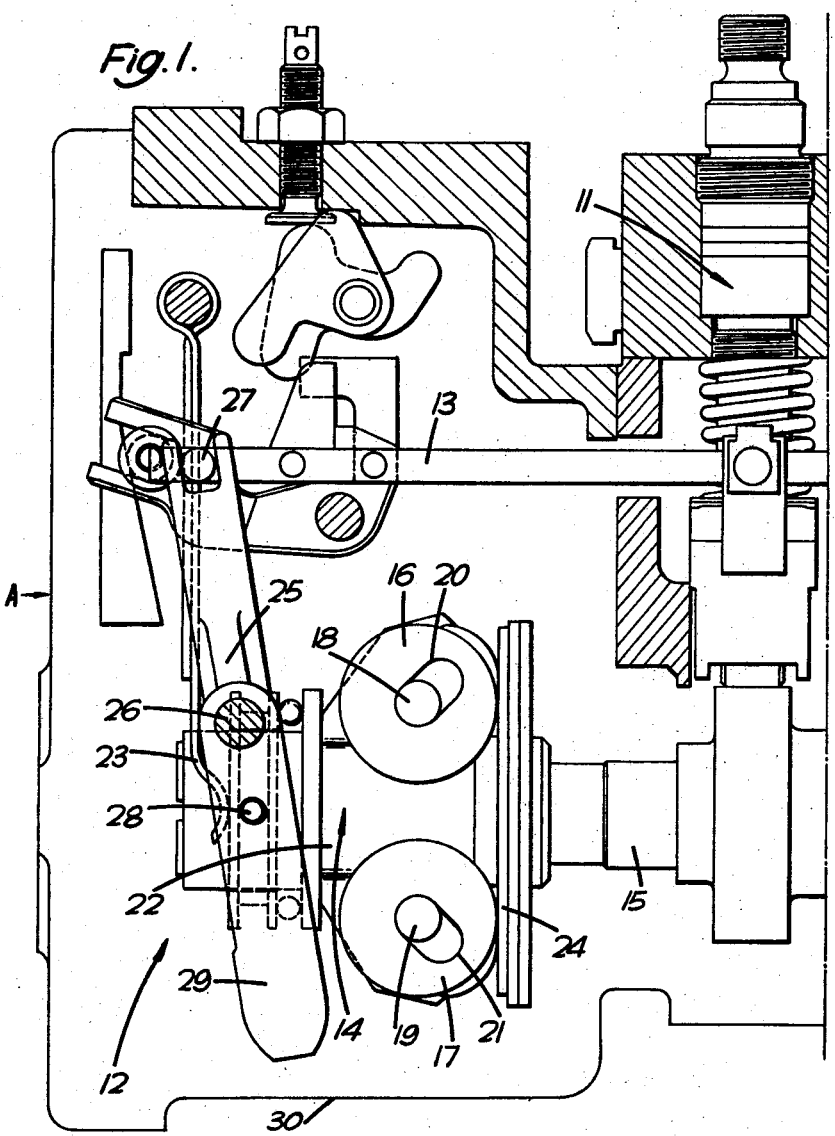

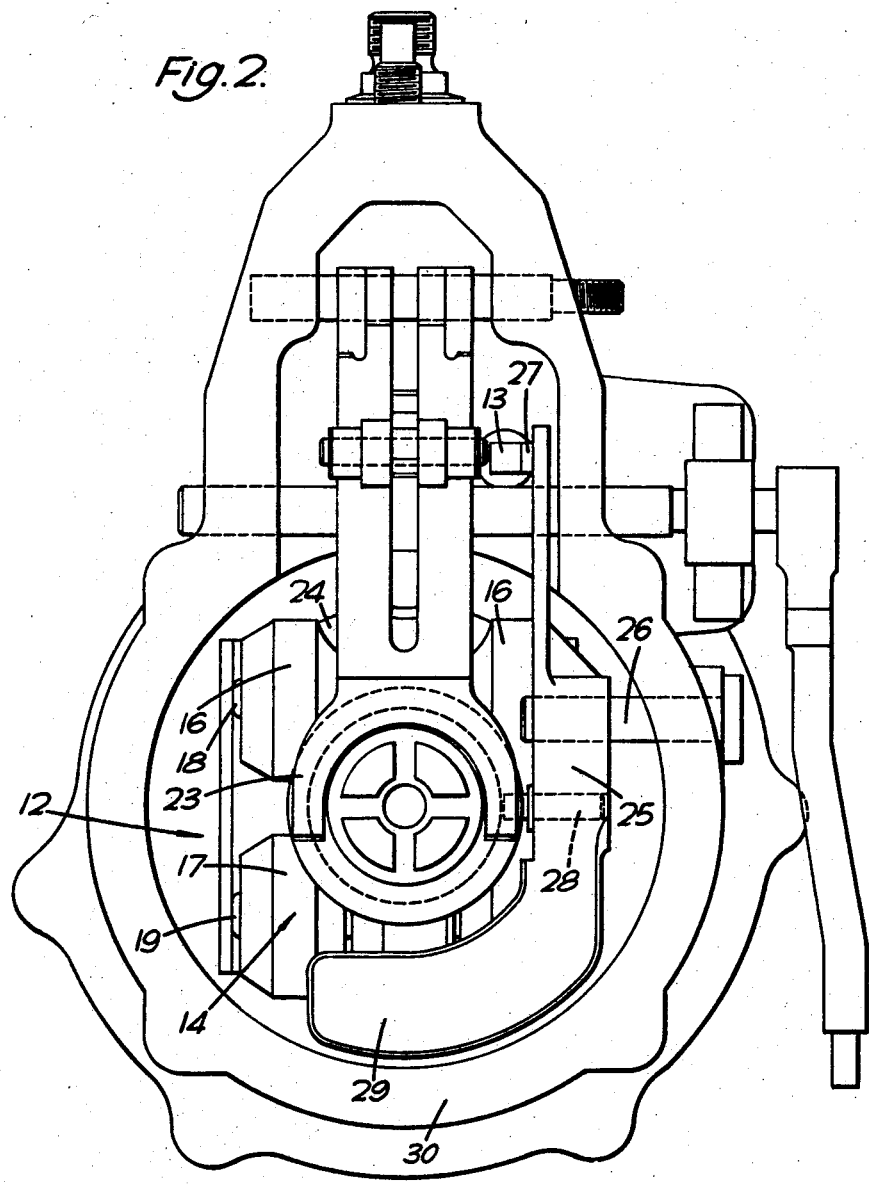

United States Patent Office

3,495,535
Patented Feb. 17, 1970

3,495,535
FUEL INJECTION APPARATUS FOR MOTOR VEHICLES
Thomas Paterson and John A. Howard, London, England, assignors to Simms Motor Units Limited, London, England, a British company
Filed Aug. 16, 1968, Ser. No. 753,098
Claims priority, application Great Britain, Aug. 22, 1967, 38,610/67
Int. Cl. F04b 49/00; F02d 1/04
U.S. Cl. 103—35    6 Claims

ABSTRACT OF THE DISCLOSURE

Fuel injection apparatus for a motor vehicle comprises a control rod movable axially by a centrifugal governor to control the amount of fuel delivered by fuel injection pump. The governor is connected to the control rod by a pivotally mounted link member having a weight member at its end on the side of the pivot remote from the control rod. The inertia of the weight member counteracts the inertia of the control rod when the vehicle brakes and thereby avoids engine stalling.

---

The invention relates to fuel injection apparatus for a motor vehicle.

The invention provides fuel injection apparatus for a motor vehicle which apparatus comprises a fuel injection pump, a control member movable to adjust the rate of delivery of the pump, a centrifugal governor for moving the control member in dependence on the speed of rotation of the governor and connecting means connecting the governor and the control member, which connecting means comprises a pivotally mounted link member having a weight member on the side of the pivot remote from the control member whereby the inertia of the weight member tends to oppose movement of the control member due to inertia of the control member.

The weight member may comprise an enlarged bob at the end of the link member remote from the control member.

Preferably the weight member is formed as an extension on the end of the link member remote from the control member and extends transverse to the length of the link member.

The invention also provides fuel injection apparatus for a motor vehicle, which apparatus comprises a fuel injection pump, a control rod movable along its length to adjust the rate of delivery of the pump, a centrifugal governor for moving the control rod in dependence on the speed of rotation of the governor, a link member interconnecting the governor and the control rod and mounted on a pivot pin between the control rod and governor, and a weighted bob member at the end of the link member remote from the control rod for opposing movement of the control rod due to its inertia when braking, the governor comprising a plurality of weighted rollers movably mounted on a housing which is connected to the link member and slidably mounted on a rotatable shaft extending parallel to said control rod, and a biasing spring urging the housing and rollers towards an abutment plate forward of said rollers whereby when said shaft rotates the rollers move outwardly across the plate and move the housing against the said spring.

Preferably the apparatus further comprises a casing surrounding the governor and the weighted bob member comprises an extension of the end of the link member extending transverse to the length of the link member between the governor and the said casing.

A specific example of fuel injection apparatus will now be described by way of example and with reference to the accompanying drawings in which:

FIGURE 1 is a sectional view through part of a fuel injection device; and

FIGURE 2 is a view in the direction of the arrow A in FIGURE 1 with the end casing removed and some parts omitted.

This example shows a fuel injection pump 11 and control apparatus 12 for the pump 11. The pump 11 is for supplying fuel under pressure to an injector nozzle in a vehicle engine and an axially movable rod 13 is provided for adjusting the amount of fuel delivered in each pumping stroke by the pump 11. More than one pump 11 may be controlled by the rod 13 and normally one pump 11 is provided for each cylinder in the vehicle engine. The control apparatus 12 comprises a centrifugal governor 14 arranged to be rotated by a cam shaft 15 for operating the pump 11. The governor 14 includes weighted rollers 16 and 17 mounted on spindles 18 and 19 respectively passing through elongated slots 20 and 21 in an axially movable housing 22. The housing 22 is urged to the right in FIGURE 1 by a leaf spring 23 so that the rollers 16 and 17 bear against a plate 24. As the governor rotates, the rollers 16 and 17 move outwardly across the plate 24 and move the housing 22 to the left against the spring 23 to an extent depending on the speed of rotation of the governor.

Movement of the housing 22 is transmitted to the rod 13 by a link member 25 mounted on a pivot pin 26. The upper end of the link member 25 is connected to the rod 13 by a pin 27 and the governor housing 22 is connected to the link member 25 by a pin 28 below the pivot pin 26.

As shown in FIGURE 2, the link member 25 has a weighted portion in the form of an enlarged bob 29 at its lower end, that is on the side of the pivot pin 26 remote from the rod 13. The weighted portion is formed integrally with the link member 25 and is curved around below the governor 14 and inside an outer casing 30. The weighted portion 29 extends transverse to the length of the link member 25.

It will be seen in FIGURE 2 that the part of the link member 25 above the pivot pin 26 is much smaller in cross section than the part of the link member 25 below the pin 26. This results in the inertia of the link member itself assisting the effect of the weighted portion 29.

The fuel pump shown in FIGURE 1 is mounted in a motor vehicle so that the front of the vehicle is to the right in FIGURE 1. When the vehicle slows down or stops due to braking, the inertia of the control rod 13 tends to move the rod 13 to the right and thereby cause the pump 11 to deliver less fuel. If this movement is allowed, it could result in the engine stalling. However, the inertia of the weighted portion 29 tends to move the lower end of the link member 25 to the right when the vehicle brakes and this opposes the inertia effect of the control rod 13. In this way, the inertia effects of the control rod 13 and weighted portion 29 act on opposite sides of the pivot pin 14 and tend to oppose each other and reduce the likelihood of the engine stalling when the vehicle brakes.

We claim:

1. Fuel injection apparatus for a motor vehicle which apparatus comprises a fuel injection pump, a control member movable to adjust the rate of delivery of the pump, a centrifugal governor for moving the control member in dependence on the speed of rotation of the governor and connecting means connecting the governor and the control member, which connecting means comprises a pivotally mounted link member having a weight member on the side of the pivot remote from the control member whereby the inertia of the weight member tends to oppose movement of the control member due to inertia of the control member.

2. Fuel injection apparatus as claimed in claim 1 wherein the weight member comprises an enlarged bob at the end of the link member remote from the control member.

3. Fuel injection apparatus as claimed in claim 1 wherein the weight member is formed as an extension on the end of the link member remote from the control member and extends transverse to the length of the link member.

4. Fuel injection apparatus as claimed in claim 3 in which the part of the link member between the said pivot and the control means is of smaller cross section than the part of the link member on the other side of the pivot.

5. Fuel injection apparatus for a motor vehicle, which apparatus comprises a fuel injection pump, a control rod movable along its length to adjust the rate of delivery of the pump a centrifugal governor for moving the control rod in dependence on the speed of rotation of the governor a link member interconnecting the governor and the control rod and mounted on a pivot pin between the control rod and governor and a weighted bob member at the end of the link member remote from the control rod for opposing movement of the control rod due to its inertia when braking, the governor comprising a plurality of weighted rollers movably mounted on a housing which is connected to the link member and slidably mounted on a rotatable shaft extending parallel to said control rod, and a biassing spring urging the housing and rollers towards an abutment plate forward of said rollers whereby when said shaft rotates the rollers move outwardly across the plate and move the housing against the said spring.

6. Fuel injection apparatus as claimed in claim 5 further comprising a casing surrounding the governor and in which the weighted bob member comprises an extension of the end of the link member extending transverse to the length of the link member between the governor and the said casing.

References Cited

UNITED STATES PATENTS

| | | | |
|---|---|---|---|
| 2,503,946 | 4/1950 | Hallett | 123—140 |
| 3,107,483 | 10/1963 | Hamilton | 123—140 |
| 3,185,141 | 5/1965 | Miracki et al. | 123—140 |
| 3,215,185 | 11/1965 | Black | 123—140 |
| 3,411,365 | 11/1968 | Roosa | 73—535 |

HENRY F. RADUAZO, Primary Examiner

U.S. Cl. X.R.

123—140